UNITED STATES PATENT OFFICE.

ALOIS SCHAIDHAUF, OF FRANKFORT-ON-THE-MAIN, GERMANY, ASSIGNOR TO ROESSLER AND HASSLACHER CHEMICAL COMPANY, OF NEW YORK, N. Y., A CORPORATION OF NEW YORK.

STABLE ALKALINE SOLUTIONS CONTAINING ACTIVE OXYGEN.

1,181,410.     Specification of Letters Patent.     Patented May 2, 1916.

No Drawing.     Application filed October 21, 1913. Serial No. 796,412.

*To all whom it may concern:*

Be it known that I, ALOIS SCHAIDHAUF, a subject of the Emperor of Germany, and a resident of Frankfort-on-the-Main, Germany, have invented certain new and useful Improvements in Stable Alkaline Solutions Containing Active Oxygen; and I do hereby declare the following to be a full, clear, and exact description of the same.

This invention relates to alkaline solutions containing active oxygen and has for its object to preserve the efficiency of such solutions.

In my copending application for U. S. Letters Patent Serial No. 764,738, filed May 1, 1913, I have described a process for rendering stable alkaline solutions containing active oxygen, said process consisting essentially in adding to the solution to be stabilized, small quantities of a soluble magnesium salt, preferably small quantities of a combination of magnesia, or magnesium salt, with silica or silicates respectively.

I have now made the surprising observation that the catalyzer has occasionally greatly varying effects on the solution to be rendered stable notwithstanding the fact that the catalyzer consists of the same material. By thorough investigations I have found out that the stabilizing effect of the materials mentioned above is greatly dependent on the state in which they exist in the solution. If for instance one uses stabilizing agents of a form permitting the greatest possible distribution in the solution, as for instance of colloidal or gelatinous form, one obtains solutions of most desirable stability.

I have not yet succeeded in definitely explaining the reasons for the difference of the stabilizing effect as apparently caused by the difference in the state of the catalyzer; the circumstance, however, that particularly colloidal or gelatinous magnesia or combinations with magnesium salts display an especially prominent effect, admits of the supposition that the phenomena of adsorption may be considered to be the cause.

I add the colloid already formed to the solution carrying oxygen in an available form.

In the present case one may also use natural water containing colloidal stabilizing agents or one may generate the same in waters containing one component of the same, by adding the missing component. The quantity of the protecting stabilizing agent needs only to be a very small one; furthermore only such small quantities come into consideration for the application of the process that the viscosity of the solution containing the active oxygen is not changed materially.

For the better understanding of my process I cite the following example: To a solution containing two gr. (2 gr.) sodium peroxid in 1 liter of water a solution of 0.15 gr. waterglass and 0.12 gr. of magnesium chlorid are added. By the interaction of the latter substances a colloidal or gelatinous combination of silica and magnesia is formed in the solution.

What I claim is:

1. An alkaline solution containing active oxygen and a stabilizing agent in a colloidal form.

2. An alkaline solution containing active oxygen and a colloidal substance as a stabilizing agent susceptible to great distribution in the solution.

3. An alkaline solution containing active oxygen and a colloidal magnesium compound.

4. An alkaline solution containing active oxygen and a colloidal combination of magnesia and silica.

In testimony whereof I have signed this specification in the presence of two subscribing witnesses.

ALOIS SCHAIDHAUF.

Witnesses:
   HORST ZIEGLER,
   JEAN GRUND.

Copies of this patent may be obtained for five cents each, by addressing the "Commissioner of Patents, Washington, D. C."